(12) United States Patent
Lucchi

(10) Patent No.: US 9,948,157 B2
(45) Date of Patent: Apr. 17, 2018

(54) CONTAINING CASING FOR A STATOR OF AN ELECTRIC MACHINE AND STATOR ASSEMBLY USING SAID CASING

(71) Applicant: LUCCHI R. ELETTROMECCANICA SRL, Rimini (IT)

(72) Inventor: Giorgio Lucchi, Rimini (IT)

(73) Assignee: LUCCHI R. ELETTROMECCANICA SRL, Rimini (IT)

(*) Notice: Subject to any disclaimer, the term of this patent is extended or adjusted under 35 U.S.C. 154(b) by 357 days.

(21) Appl. No.: 14/599,890

(22) Filed: Jan. 19, 2015

(65) Prior Publication Data

US 2016/0211718 A1    Jul. 21, 2016

(51) Int. Cl.
  *H02K 5/20* (2006.01)
  *H02K 9/19* (2006.01)
  *H02K 9/08* (2006.01)

(52) U.S. Cl.
  CPC ............... *H02K 5/20* (2013.01); *H02K 9/08* (2013.01); *H02K 9/19* (2013.01)

(58) Field of Classification Search
  CPC ............... H02K 5/20; H02K 9/08; H02K 9/19
  USPC ............... 310/52, 54, 216, 216.014
  IPC ................. H02K 5/20,9/19
  See application file for complete search history.

(56) References Cited

U.S. PATENT DOCUMENTS

| 3,184,624 A | * | 5/1965 | Solomon | H02K 9/19 |
|  |  |  |  | 310/54 |
| 4,563,606 A | * | 1/1986 | Fukasawa | H02K 3/12 |
|  |  |  |  | 310/164 |
| 7,036,207 B2 | * | 5/2006 | Neal | G11B 19/2009 |
|  |  |  |  | 29/596 |
| 2005/0035672 A1 |  | 2/2005 | Ward |  |
| 2011/0156510 A1 | * | 6/2011 | Okada | H02K 1/20 |
|  |  |  |  | 310/54 |

(Continued)

FOREIGN PATENT DOCUMENTS

| DE | 10 2012 101346 A1 | 8/2012 |
| EP | 1 901 418 A1 | 3/2008 |

(Continued)

OTHER PUBLICATIONS

European Search Report.

*Primary Examiner* — John K Kim
(74) *Attorney, Agent, or Firm* — Pearne & Gordon LLP

(57) ABSTRACT

A containing casing for a stator of an electric machine defines, around said axis, a compartment to house the stator. A first radially inner part and a second radially outer part are coupled to one another and define together at least one duct surrounding the axis for the passage of a cooling fluid. Said duct comprises, in turn, a plurality of first sections and a plurality of second sections, which are distributed around the axis alternated with one another. The first sections are arranged around the axis with an arrangement that supports the motion of the fluid around the axis. The second sections are transverse to the first sections and at least partially obtained inside respective protuberances of the first radially inner part, which project towards the inside of the compartment. A space for the insertion of radially projecting portions of electric windings of the stator is defined between two consecutive protuberances around the axis.

8 Claims, 7 Drawing Sheets

(56) References Cited

U.S. PATENT DOCUMENTS

2012/0091838 A1* 4/2012 Miyamoto ............... H02K 9/19
                                                      310/54
2014/0354090 A1   12/2014 Chamberlin
2016/0211718 A1*  7/2016 Lucchi .................... H02K 5/20

FOREIGN PATENT DOCUMENTS

| EP | 1901418 | 3/2008 |
|----|---------|--------|
| WO | WO 2010/061278 | 6/2010 |
| WO | WO 2010/1222404 A1 | 10/2010 |
| WO | WO 2013/118703 A1 | 8/2013 |

* cited by examiner

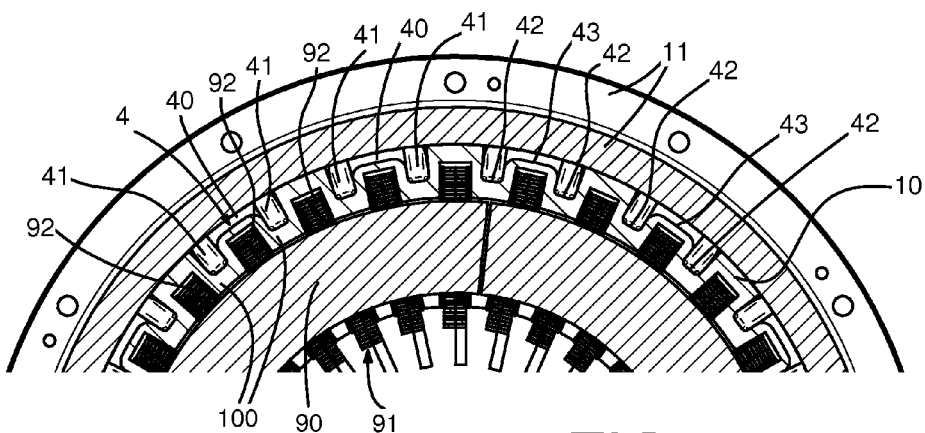
FIG. 6
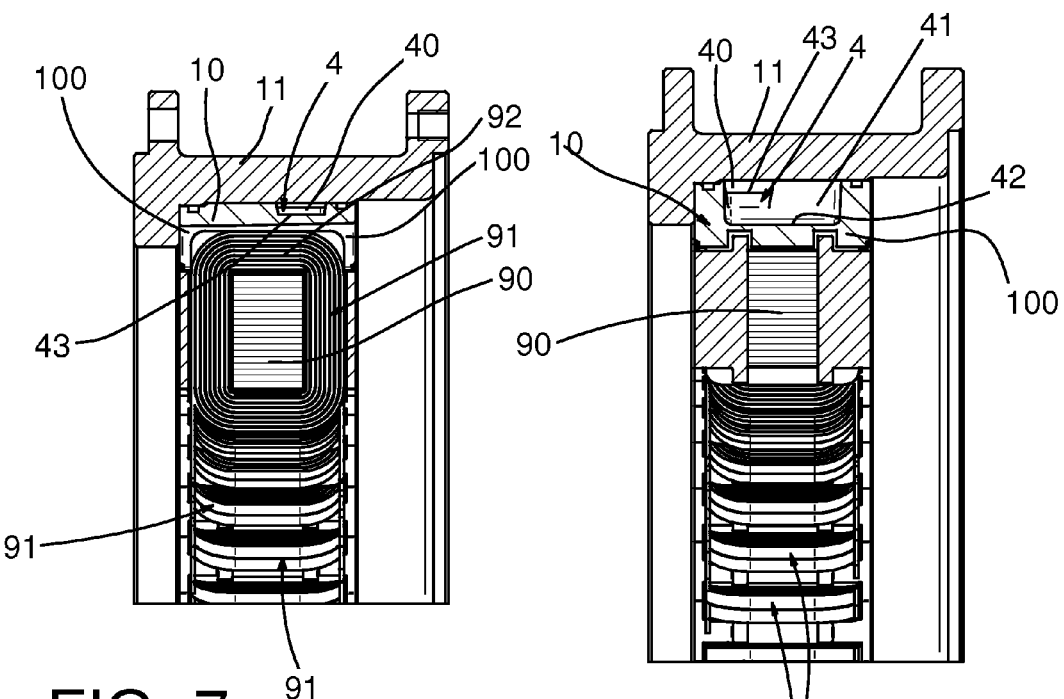
FIG. 7
FIG. 8

CONTAINING CASING FOR A STATOR OF AN ELECTRIC MACHINE AND STATOR ASSEMBLY USING SAID CASING

FIELD OF THE INVENTION

The present invention relates to a containing casing for a stator of an electric machine. The present invention, furthermore, relates to a stator assembly using said casing.

BACKGROUND OF THE INVENTION

Generally speaking, an electric machine comprises a stationary part, commonly referred to as "stator" (or "stator assembly"), and a mobile part, both equipped with windings of electrical conductor and/or sources of a magnetic and/or electromagnetic field. Together with the machine structure, these windings and sources always form both an electric circuit (defined as an assembly of structures and materials with an electric current and/or an electric field flowing through it) and a magnetic circuit (defined as an assembly of structures and materials with a magnetic field flowing through it). In order to operate, the electric machine uses electromagnetic induction (produced by the linkage of magnetic field fluxes with the electric windings) and/or electromagnetic forces (generated by the magnetic/electromagnetic field sources on the electric windings with current flowing through them and/or on the other magnetic/electromagnetic field sources). Some electric machines (for example, electric motors) can convert the electric current circulating in the electric windings into movement of the mobile part relative to the stator. Other electric machines (for example, generators) can generate electric current and/or electrically driving forces in the electric windings using the motion of the mobile part relative to the stator. An electric machine of this kind can normally be used in both ways (that is, as a generator and as a motor). The electric windings can be made around a core of magnetic material in order to optimize the effect of the linkage of the magnetic flux with the electric windings themselves.

In one type of electric machine, the mobile part is a rotary member, also known as "rotor" (or "rotor assembly"). The axis of rotation of the rotor is particularly important and is usually used as the reference and/or symmetry axis for the structure of the electric machine. As the rotor moves relative to the stator, portions of the magnetic field sources and portions of the electric windings face each other at a given distance defining a gap between the rotor and the stator. There is a geometrical relationship between the axis of rotation of the rotor and the way in which the streamlines of the magnetic field, generated by the sources, are arranged in the gap between the stator and the rotor. Based on this geometrical relationship, machines of this kind can be divided into two categories: radial flux electric machines and axial flux electric machines. In a radial flux electric machine, the arrangement of the magnetic field sources and of the electric windings, with which the magnetic field is linked, is such that, in the aforesaid gap between rotor and stator, the streamlines of the magnetic field can be approximated with segments stemming from straight lines that are perpendicular to the rotation axis of the rotor and are arranged in a radial manner relative to the rotation axis itself. In an axial flux electric machine, the arrangement of the magnetic field sources and of the electric windings, with which the magnetic field is linked, is such that, in the aforesaid gap between rotor and stator, the streamlines of the magnetic field can be approximated with segments stemming from straight lines that are parallel to the rotation axis of the rotor.

In general, an electric machine of this type comprises: a stator with a generically toroidal shape and a rotor, which are both coaxial to the rotation axis of the rotor.

In radial flux electric machines, the rotor is generally inserted into the central hole of the toroid making up the stator. In the most common type of axial flux electric machine, the rotor has the shape of a disc and faces one of the bases of the toroid making up the stator. In some cases the machine has two disc-shaped rotors, each one facing a respective face of the stator. Some electric machines can comprise two or more toroidal stators, which alternate with disc-shaped rotors (in a particular configuration of this type, a disc-shaped rotor is arranged between two toroidal stators).

Generally, on the rotor there are placed the magnetic field sources, which are preferably made with permanent magnets, whereas on the stator assembly there are usually placed the electric windings with which the magnetic field is linked. The magnetic field sources are usually placed on a circular crown of the rotor disc, which faces a base of the toroid making up the stator.

The stator of an axial flux electric machine, in particular, comprises a core with a toroidal shape, which is provided with an outer cylindrical lateral surface and with an inner cylindrical lateral surface, which are both coaxial to an axis that coincides with the rotation axis of the rotor. The core is also delimited, along the axis, by a first and a second base. The core is made of a magnetic—preferably ferromagnetic—material. The electric windings are manufactured in the form of a plurality of coils that are arranged one after the other at a given distance along the annular shape of the core and are electrically connected to one another in different ways. Each coil usually has a through hole, around which the electric conductor making it up is wound.

The bases of the core can consist of flat surfaces, in which case the core of the stator is defined as "slotless".

Alternatively, either or both bases of the core can have protuberances, also called "teeth", which project from the core along the common axis of the cylindrical lateral surface covering a given distance. In general, the teeth extend in length from the outer lateral surface up to the inner lateral surface. The teeth can be manufactured as one single piece together with the core or be fixed thereto in different ways after the core has been manufactured. The space defined between two successive teeth in the annular shape of the core is also known as "slot" and usually houses portions of the windings. In this case, the core of stator is "slotted". The teeth are usually made of a magnetic material and help link the magnetic flow with the windings (in particular by affecting the magnetic reluctance of the magnetic circuit in correspondence to the electric windings).

In order to reduce parasitic currents in the core (currents that tend to arise in the core along rings surrounding the streamlines of the magnetic field and determine efficiency losses of the electric machine), the core itself is usually manufactured by winding a metal sheet on itself in a spiral shape around the common axis of the cylindrical lateral surfaces of the core. In this way, the interfaces between a metal sheet winding and the other are distributed crossways relative to the annular paths of parasitic currents, thus breaking them and reducing their influence.

In a first stator configuration, the solid part of the core goes through the through hole of the coils. Therefore, in general, when the core is provided with slots, one of the teeth is arranged between one coil and the other and each coil rests on a plane of its that is transverse to the toroidal shape of the core.

In a second stator configuration provided with slots, a corresponding tooth goes through the through hole of each coil. Hence, the coil is entirely arranged on a base of the core or on the other base of the core and part of its electric conductor is inserted into the slots between the teeth. The same slot can be shared by two consecutive coils along the annular shape of the core, or not.

In both stator configurations described above, the coils project in a radial direction, relative to the axis, towards the outside of the stator. Therefore, on the outside of the rotor, in a radial direction relative to the axis, a space is defined between two consecutive coils.

The electric machine also comprises a casing (or case), which is generally fixed to the core with the windings and surrounds at least the core around its axis. In general, the casing is part of the stator of the electric machine.

During the operation of the electric machine, power losses occur in the electric circuit and in the magnetic circuit, namely:
- the so-called "cooper losses" (namely power losses in the electric circuit of the machine due to the Joule effect mainly caused by the current flowing in the different windings and electric conductors);
- the so-called "iron-losses" (namely power losses in the magnetic circuit of the machine mainly due to the magnetic hysteresis of magnetic materials and to parasitic currents—also known as "eddy currents"—which occur in the active parts of the machine, in particular in the stator parts, i.e. core and coils).

These power losses generate the development of heat, which must be removed and moved to the surrounding environment as effectively as possible: the development of excessively high temperatures in the active parts of the machine (core and coils, in the case of the stator) might jeopardize the integrity and the functionality of the electrically insulating parts, which are the most delicate in terms of temperature.

U.S. Pat. No. 7,332,837 B2 discloses a stator for an electric machine with an attached cooling system. More specifically, the stator assembly comprises a toroidal core. Electric conductor coils are arranged along the annular shape of the core so as to be spaced apart from one another, each coil having a lying plane that is arranged radially, i.e. contains the axis of the toroid. The stator assembly comprises an outer casing made of metal (preferably aluminium), which surrounds the core from the outside, remaining coaxial to the core itself. The casing has teeth that radially project inwards and are each inserted in the space between two successive coils along the annular shape of the core. The body of the annular casing comprises, embedded therein, a cooling duct, which also has an annular shape and circumferentially and externally surrounds both the core and the coils. A cooling liquid flows in the cooling duct. The teeth of the casing act as cooling fins. The spaces between these cooling fins and the coils are preferably filled with a filling material having a good heat conductivity.

The stator of the electric machine with cooling system described above has some drawbacks.

In particular, the cooling of the body of the coils is mainly entrusted to the sole contact with the metal teeth of the casing, the annular cooling duct surrounding, from the outside, the entire assembly consisting of the core and the coils. For this reason, the cooling obtained in this way is not optimal and risks being insufficient in particular operating conditions or in electric machines that have to be optimized to ensure high performances.

International patent application PCT/IB2009/007570 (published with no. WO 2010 061278 A2) discloses the stator of an electric machine provided with a liquid cooling duct, wherein the cooling duct is applied, according to an annular arrangement, around the core and comprises a plurality of sections, which are oriented parallel to the axis of the stator and are each inserted between two successive coils along the annular shape of the core, into the space created between the parts of the coils that radially project from the core. These sections of the duct are connected to one another by duct portions that circumferentially develop around the core.

By leading the cooling liquid flow directly between the coils of the electric windings, this system ensures a good cooling efficiency. However, this solution does not lack drawbacks.

In particular, the cooling duct, which is preferably manufactured in the form of a shaped serpentine, is conceived as an element on itself, which is applied onto the core and then locked there by applying an outer containing casing made of metal and/or by subsequently applying a suitable resin made of an electrically insulating material with good thermal conductivity properties. For this reason, the stator is difficult and partially delicate to assemble, especially when the duct and the core have to be coupled and when the entire assembly has to be closed.

SUMMARY OF THE INVENTION

An object of the present invention is to provide a containing casing for the stator of an electric machine, which is able to overcome the drawbacks of the prior art mentioned above. A further object of the present invention is to provide a stator assembly using said casing.

In particular, an object of the present invention is to provide a containing casing for the stator of an electric machine and a stator assembly using said casing, which create a cooling system in which the cooling of the active parts of the stator is efficient. A further object of the present invention is to provide a containing casing for the stator of an electric machine and a stator assembly using said casing, whose assembling is easy and precise.

These and other objects of the invention, which will be best understood upon perusal of the following description, are reached, according to the present invention, by means of a containing casing for the stator of an electric machine (and a stator assembly using said casing) having the structural and functional features set forth in the appended independent claims, further embodiments thereof being described in the appended dependent claims.

BRIEF DESCRIPTION OF THE DRAWINGS

The invention is described in detail below with the help of the drawings, which show a merely explanatory and non-limiting embodiment thereof.

FIG. 6 is an enlarged detail of the cross-section of FIG. 4.

FIG. 7 and FIG. 8 are enlarged details of the upper part and of the lower part, respectively, of the cross-section of FIG. 5.

DETAILED DESCRIPTION OF THE INVENTION

Figure 1:
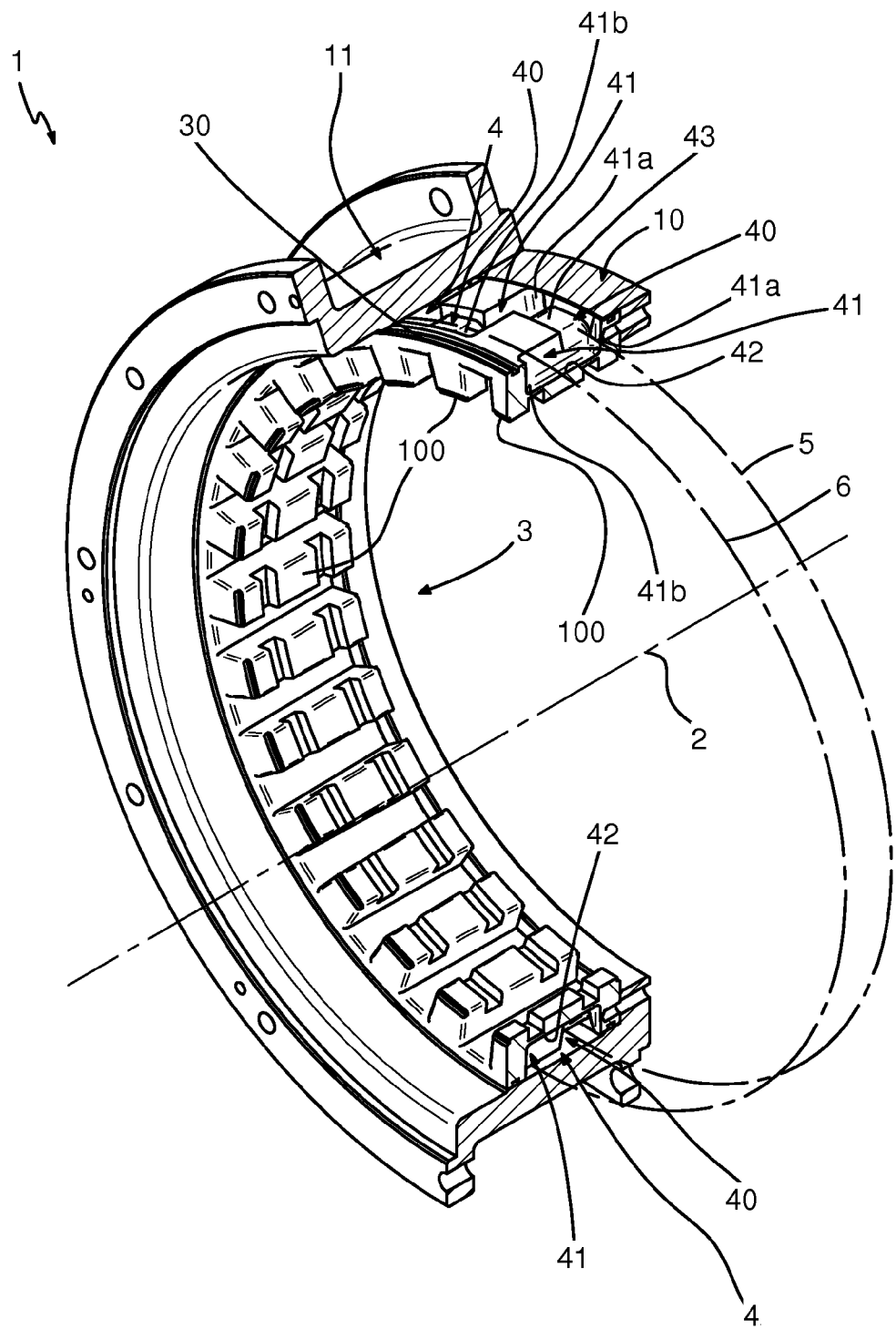
FIG. 1 is a perspective view of a containing casing according to the invention, partially cross-sectional and with some parts partially removed to better show other parts.

With reference to the figures, a containing casing 1 for a stator of an electric machine develops around an axis 2, which coincides with an axis of a stator (the stator being indicated in the figures with number 1). The casing 1 defines, around said axis 2, a compartment 3 to house the stator 8 itself. The casing 1 comprises a first radially inner part 10 and a second radially outer part 11, which are coupled to one another in a fluid-tight manner and define together, inside the volume defined by their coupling, at least one duct 4 surrounding the axis 2 for the passage of a cooling fluid. Preferably, the cooling fluid is a liquid. The first radially inner part 10 and the second radially outer part 11 have an annular shape, preferably with a toroidal geometry, and are coupled to one another in correspondence to respective circumferential portions (as clearly shown, for example, in FIG. 1). They are joined to one another in different ways, preferably in a removable manner (for example, by means of coupling with fixing screws and flanges especially obtained for this purpose or by means of rivets or with nuts and bolts. The fluid-tight sealing (to avoid cooling liquid leakages) can be easily obtained by means of sealing gaskets, which are arranged between the first radially inner part 10 and the second radially outer part 11, for example in the form of "o-rings", which annularly develop around the axis 2. These gaskets can be inserted into suited annular seats 30, which are obtained either on the first radially inner part 10 or on the second radially outer part 11, or on both of them.

Said duct 4 (defined by the combination of the first radially inner part 10 with the second radially outer part 11) comprises, in turn, a plurality of first sections 40 and a plurality of second sections 41, which are distributed around the axis 2 alternated with one another. The first sections 40 are arranged around the axis 2 with an arrangement that supports the motion of the fluid around the axis 2 itself. The second sections 41 are transverse to the first sections 40 and at least partially obtained inside respective protuberances 100 of the first radially inner part 10. Said protuberances 100 project towards the inside of the compartment 3. A space for the insertion of radially projecting portions of electric windings of the stator is defined between two consecutive protuberances 100 around the axis 2.

Along the path of the cooling fluid in the duct 4, each first section 40 is followed by a second section 41 and, in turn, each second section 41 is followed by a respective first section 40.

Thanks to the arrangement of the first sections 40 of the duct 4, the liquid circulates around the axis 2 on the inside of the duct 4 itself. During this movement, the cooling liquid flows close to the radially outer ends of the windings when it streams through the first sections 40 themselves and, as it flows from each first section 40 to the following second section 41, the cooling liquid streams through said second section 41 on the inside of the respective protuberance 100. In this way, as it flows through each second section 41 of the duct, the cooling liquid penetrates into the spaces between the radially projecting portions of the electric windings, thus streaming, on the inside of the protuberances 100, next to the electric windings themselves.

Since the action of the cooling fluid is brought from the outside of the windings up to next to them in the gaps between one winding and the other (or between one coil and the other), the cooling is very effective. The casing 1 (in particular the first and the second portions 10, 11) is made of a stiff material with a low thermal conductivity. Said material preferably is a metal. Preferably, the metal comprises aluminium (in a pure form or as an aluminium alloy). More preferably, the casing 1 is made of aluminium (or an aluminium alloy).

As shown in the figures (in particular, FIGS. 1, 2, 4-8), a radially inner bottom 42 of the second duct sections 41 is obtained on the inside of the respective protuberance 100 of the first radially inner part 10 at a radial distance from the axis that is smaller compared to that of a radially inner bottom 43 of the first duct sections 40.

The structure of the casing 1, consisting of at least two parts, is easy to be assembled. The tight sealing to prevent cooling fluid leakages can be ensured in an equally easy manner. The first radially inner part 10 and the second radially outer part 11 can be manufactured in different ways: by means of extrusion in the form of an oblong and shaped element, which is then bent and welded, or by means of moulding and/or casting in a die. The first radially inner part 10 and the second radially outer part 11 can be each manufactured as one single piece or they can be manufactured in different pieces, which are then joined or connected to one another in different ways known to the person skilled in the art and able to ensure tightness against fluid leakages.

As shown in the figures, respective first sections 40 of the duct 4 lead to opposite ends 41a, 41b of each second section 41 of the duct 4, so as to form a serpentine-shaped path for the fluid.

Preferably, the plurality of first duct sections 40 are distributed along two parallel circumferences 5, 6 (partially shown in FIG. 1 with dash-dot lines). Said parallel circumferences 5, 6 are centred in the axis 2 and extend through the opposite ends 41a, 41b of the second duct sections 41. The first duct sections 40 that are consecutive along a first circumference 5 are spaced apart from one another and connect to one another first ends 41a of second duct sections 41 that are consecutive around the axis 2. The first duct sections 40 arranged on a second circumference 6 are spaced apart from one another, staggered relative to the ones arranged on the first circumference 5, and connect to one another second ends 41b of second duct sections 41 that are consecutive around the axis 2. In an embodiment shown in the figures, the second duct sections 41 extend parallel to the axis 2.

Figure 2:
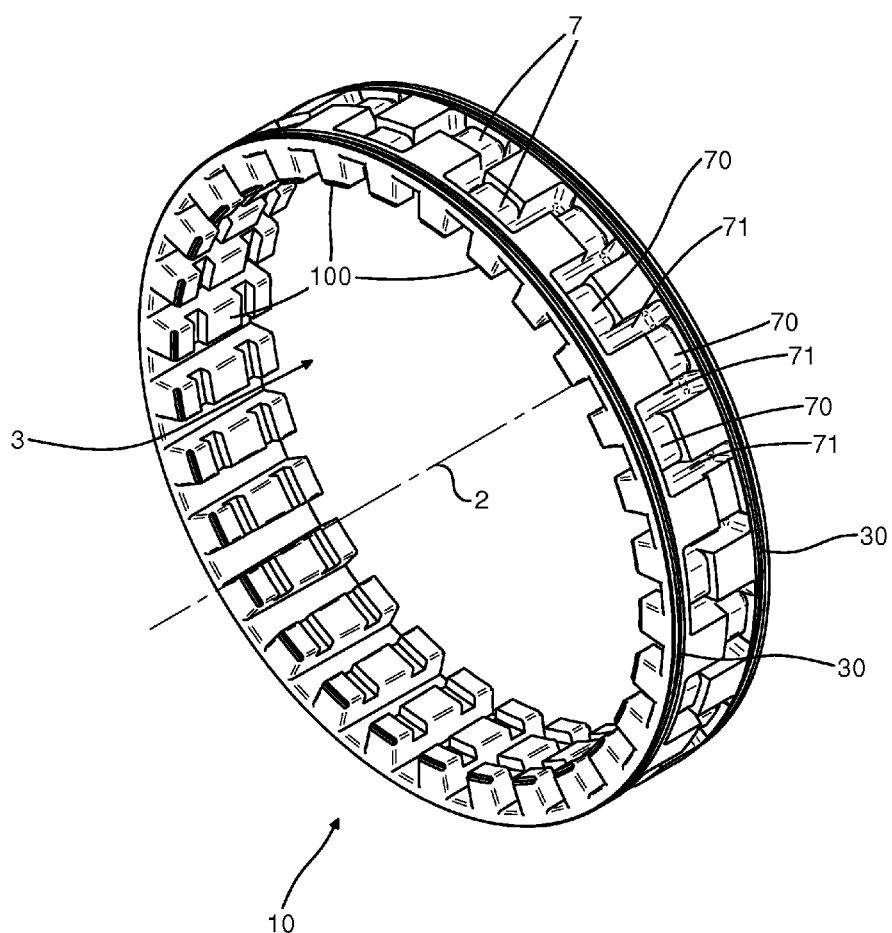
FIG. 2 is a perspective view of the radially inner part of the containing casing of FIG. 1.
Figure 3:
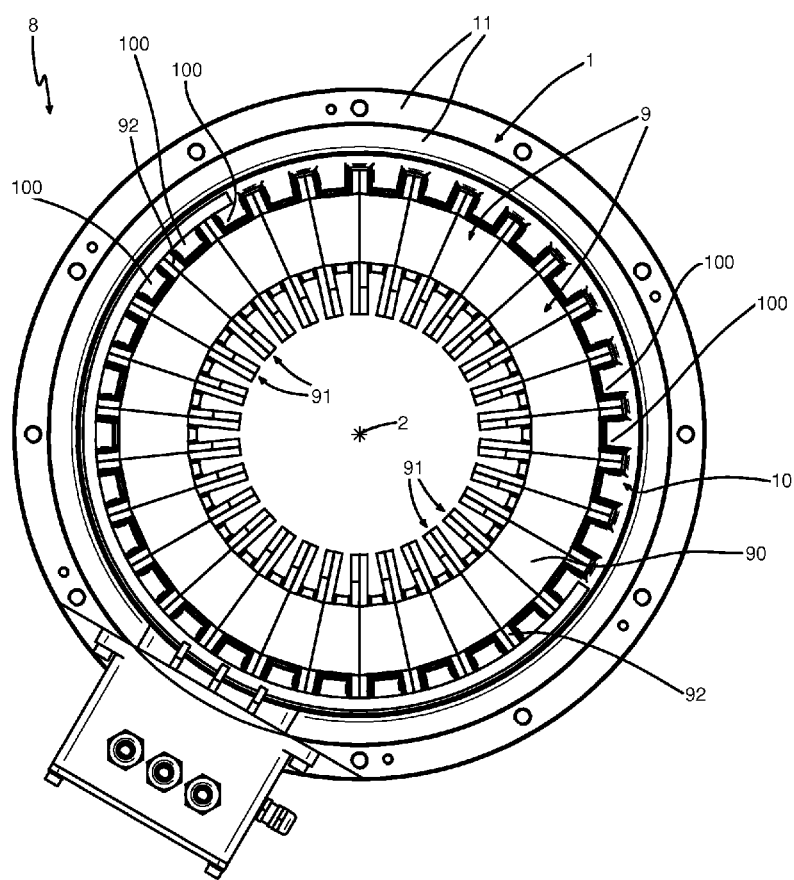
FIG. 3 is a plan view of a stator assembly using the containing casing.
Figure 4:
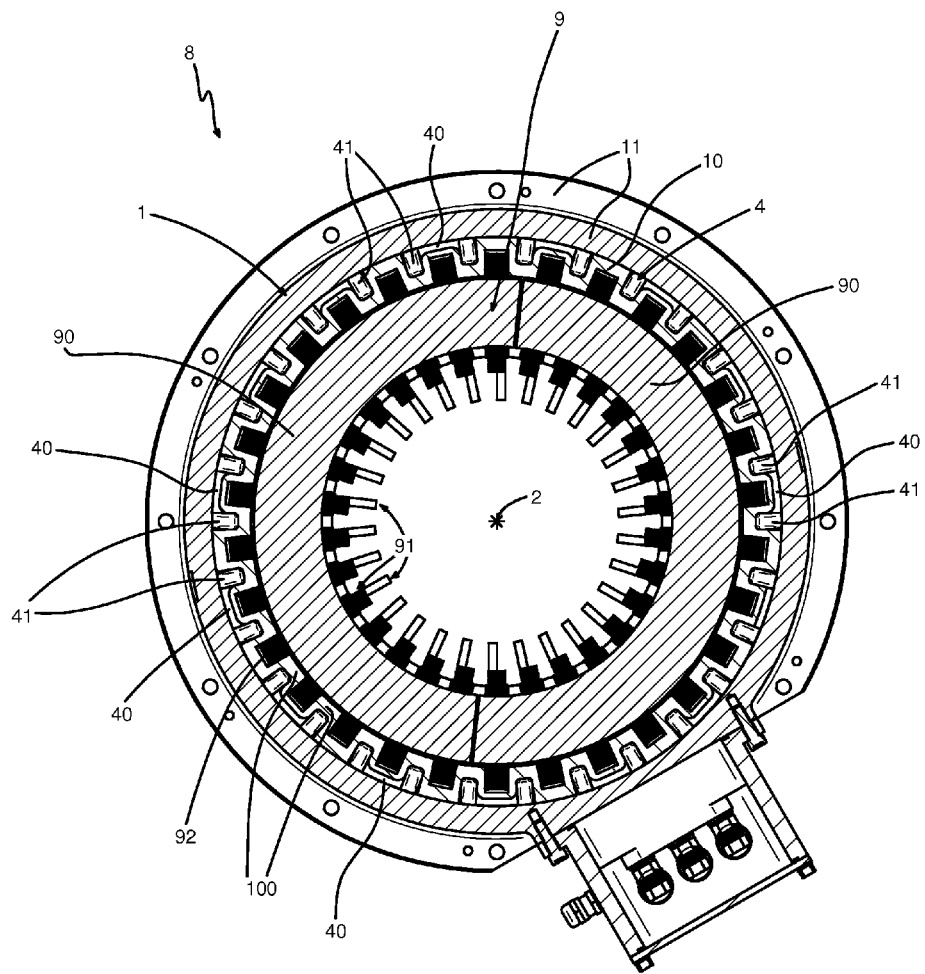
FIG. 4 shows a plan cross-section of the stator of FIG. 3, wherein some details of the containing casing are highlighted.
Figure 5:
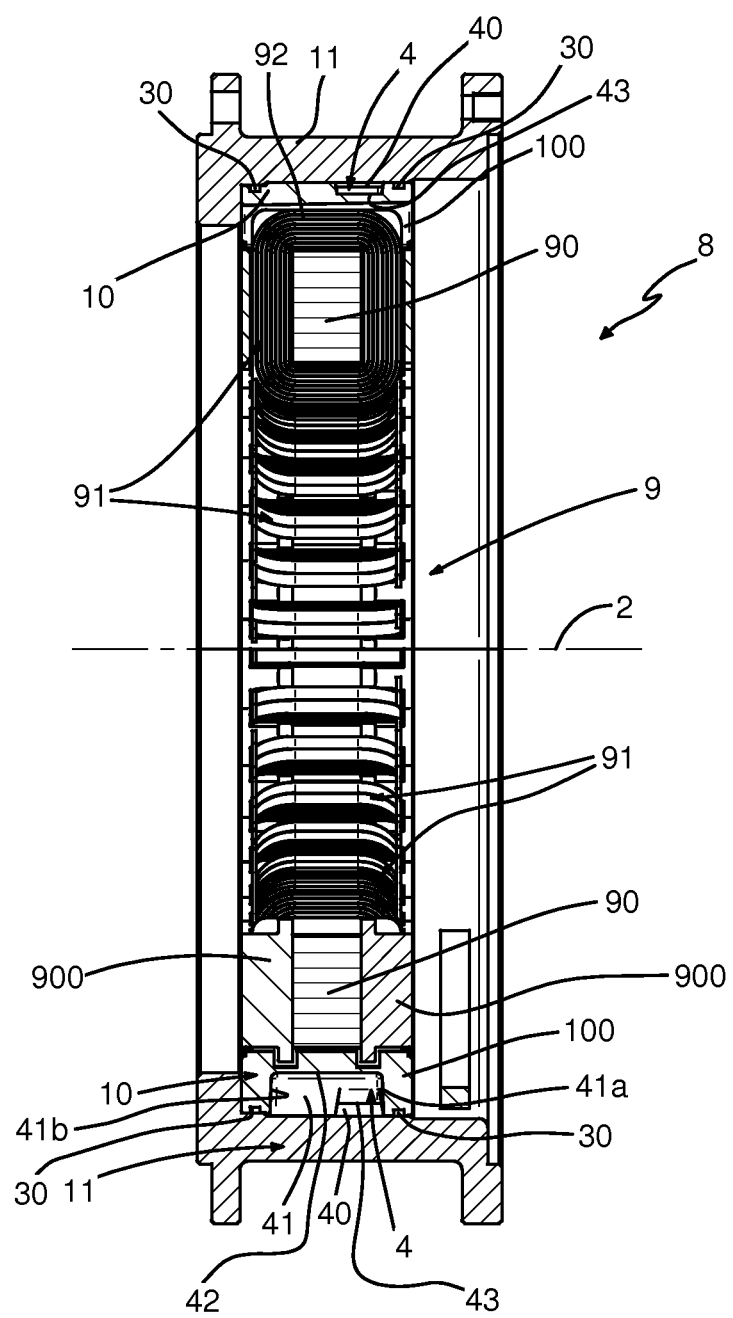
FIG. 5 is a cross-section of the stator assembly of FIGS. 3 and 4 along the cross-section plane indicated as A-A in FIG. 3, wherein the inner structure of the cooling duct defined by the casing is highlighted.

Preferably, as shown in FIG. 2, the duct 4 is defined by a shaped groove 7 obtained in the first radially inner part 10 of the casing 1. The groove 7 is open on its radially outer side. The groove 7 is tightly closed, again on its radially outer side, by the second radially outer part 11 of the casing 1, when the latter is coupled to the first radially inner part 10. This is especially shown in FIGS. 1 and 9, but it can also be seen in FIGS. 4 to 8. This structure is especially advantageous, thus allowing the cooling duct 4 to be manufactured by simply shaping (on the inside with the shaped groove 7 and on the outside with the protuberances 100) the sole first radially inner part 10 of the casing 1. The second radially outer part 11 of the casing can be manufactured as a simple element that is substantially smooth on the inside.

The shaped groove 7 has first portions 70 corresponding to the first duct sections 40 and second portions 71 joined to the first portions 70 and corresponding to the second duct sections 41.

The first portions 70 of the shaped groove 7 have a depth, in the radial direction, that it smaller compared to the depth, also in the radial direction, of the second portions 71. The radially inner bottoms 43 of the respective first duct sections 40 lie in the first portions 70 of the shaped groove 7. The radially inner bottoms 42 of the second duct sections 41 lie in the second portions 71 of the shaped groove 7. The second portions 71 of the shaped groove 7 project, in depth in the radial direction, into the protuberances 100. More specifically, each second portion of the shaped groove 7 extends on the inside of a respective protuberance 100.

Preferably, the protuberances 100 of the first radially inner part 10 extend along planes containing the axis 2.

Along the path in the cooling duct 4, the cooling liquid is forced to flow through cross-sections with different widths, changing direction and, at the same time, moving at different depths in the radial direction. In this way a flow of cooling fluid is obtained, which develops in a three-dimensional manner at different depths and with turbulences and speed variations, thus optimizing the cooling of the windings and of the active parts of the stator on which the containing casing 1 is designed to be used.

The invention also relates to a stator assembly using the containing casing 1. A stator assembly 8 of an electric machine comprises a stator 9 that extends around an axis. The stator 9 comprises, in turn, a toroidal core 90 made of a magnetic material, on which there are arranged, spaced apart from one another, electric conductor coils 91. The coils 91 have heads 92 that project from the core 9 in a radially outer direction. The stator assembly 8 of an electric machine comprises a containing casing 1 according to any of the embodiments described above. The containing casing 1 is arranged with its axis 2 coinciding with the axis of the stator 9 and houses the stator 9 itself in its compartment 3 with the heads 92 of the coils 91 inserted between the protuberances 100 of the first radially inner part 10 of the casing 1.

FIGS. 3 to 8 show the case in which, on the stator 9, the coils 91 are wound around the body of the core 90 of the stator 9 and have a lying plane that is arranged crosswise relative to the toroidal shape of the core 90 of the stator 9. In particular, as one can clearly see in FIG. 5, on the core 90 of the stator 9 there are obtained teeth 900, which are arranged, along the annular shape of the core 90, at a given distance from one another, so as to form the slots, where the coils 92 are housed.

Figure 9:
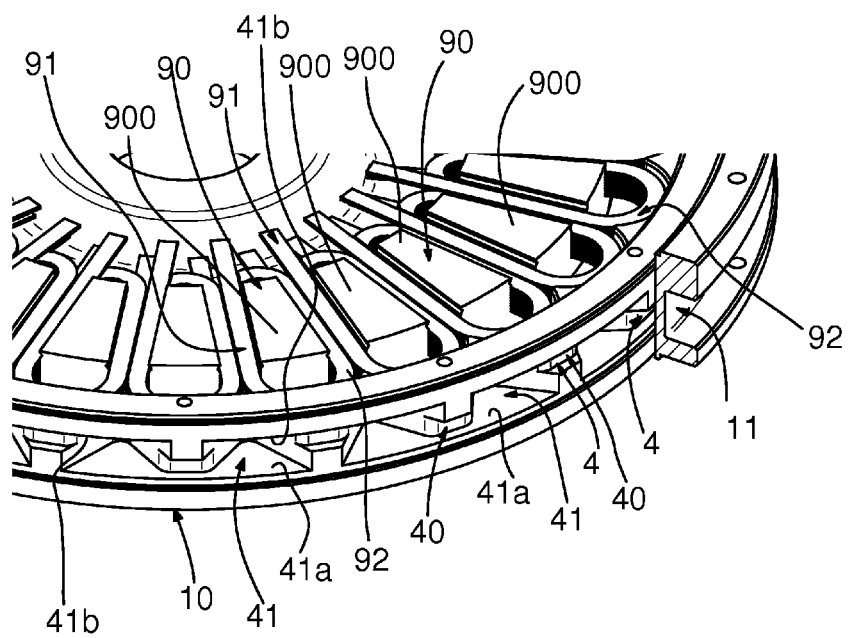
FIG. 9 is a perspective view of a portion of a stator assembly according to an alternative embodiment, together with the containing casing according to the invention, partially cross-sectional and with some parts removed to better show other parts.

FIG. 9 shows the case in which on the core 90 of the stator 9 there are obtained teeth 900, which are arranged, along the annular shape of the core 90, at a given distance from one another, so as to form the slots, where the coils 92 are housed. In this embodiment the coils 92 are each wound around a respective tooth 900. Each coil 92 has its own lying plane, which is arranged crosswise relative to the respective tooth 900. Each coil 92 lies parallel to a respective base surface of the toroid that geometrically makes up the core 90 of the stator 9; preferably, it lies on the surface of the core 90 between two teeth 900 that are consecutive along the annular shape of the core 90.

In both cases the stator assembly 8 shown comprises a similar containing casing 1.

The invention leads to important advantages. An effective cooling duct can be manufactured in a simple and easy manner. In particular, the production of the radially inner and outer parts making up the containing casing can be carried out with procedures that can be easily automated. The components of the casing can be assembled together and the casing can be applied to the stator in an easy manner, minimizing the risk of cooling fluid losses or leakages from the inside of the duct towards the outside.

The invention described may be subject to changes and adjusted in several ways without thereby departing from the inventive scope of protection that characterises it. Moreover, all the details of the invention may be replaced by technically equivalent elements.

All the materials used as well as the sizes can be chosen based on the needs of the user.

The invention claimed is:

1. A containing casing (1) for a stator of an electric machine, which casing (1) extends around an axis (2) coincident with an axis of the stator, and defines, around said axis (2), a compartment (3) to house the stator itself, characterised in that the casing (1) comprises a first radially inner part (10) and a second radially outer part (11), which are coupled to one another in a fluid-tight manner and define together, inside a volume defined by their coupling, at least one duct (4) surrounding the axis (2) for passage of a cooling fluid, said duct (4) comprising, in turn, a plurality of first sections (40) and a plurality of second sections (41), which are distributed around the axis (2), the plurality of first sections (40) being distributed along two parallel circumferences (5, 6) which are centered in the axis (2) and extend through the opposite ends (41a, 41b) of the second sections (41), the first sections (40) that are consecutive along a first circumference (5) being spaced apart from one another and each of said first sections (40) along the first circumference (5) connecting (a) a first end (41a) of one second section (41) and (b) a first end (41a) of another second section (41) that are consecutive around the axis (2), the first sections (40) arranged on a second circumference (6) being spaced apart from one another and being staggered with respect to the first sections (40) arranged on the first circumference (5); each of said first sections (40) along the second circumference (6) connecting (a) a second end (41b) of one second section (41) and (b) a second end (41b) of another second section (41) that are consecutive around the axis (2), the first sections (40) being arranged around the axis (2) with an arrangement that supports the motion of the fluid around the axis (2) itself, the second sections (41) being transverse to the first sections (40) and at least partially obtained inside respective protuberances (100) of the first radially inner part (10), said protuberances (100) projecting towards the inside of the compartment (3) and a space for the insertion of radially projecting portions of electric windings of the stator being defined between two consecutive protuberances (100) around the axis (2).

2. A casing (1) according to claim 1, characterised in that respective first sections (40) of the duct (4) lead to opposite ends (41a, 41b) of each second section (41) of the duct (4), so as to form a serpentine-shaped path for the fluid.

3. A casing (1) according to claim 1, characterised in that the second sections (41) extend parallel to the axis (2).

4. A casing (1) according to claim 1, characterised in that a radially inner bottom (42) of the second sections (41) is obtained inside the respective protuberance (100) of the first radially inner part (10) at a radial distance from the axis (2) that is smaller with respect to that of a radially inner bottom (43) of the first sections (40).

5. A casing (1) according to claim 4, characterised in that the duct (4) is defined by a shaped groove (7) obtained in the first radially inner part (10) of the casing (1), the groove (7) being open on its radially outer side, where it is tightly closed by the second radially outer part (11) of the casing (1), when the second radially outer part (11) is coupled to the first radially inner part (10).

6. A casing (1) according to claim 5, characterised in that the shaped groove (7) has first portions (70) corresponding to the first sections (40) and second portions (71) joined to the first portions (70) and corresponding to the second sections (41), the first portions (70) of the shaped groove (7) having a depth, in the radial direction, that is smaller with respect to the depth, also in the radial direction, of the second portions (71).

7. A casing (1) according to claim 1, characterised in that the protuberances (100) of the first radially inner part (10) extend along planes containing the axis (2).

8. A stator assembly (8) of an electric machine, the stator assembly comprising a stator (9) that extends around an axis and comprises, in turn, a toroidal core (90) made of a magnetic material, on which there are arranged, spaced apart from one another, the electric conductor coils (91) having heads (92) that project from the core (90) in a radially outer direction, characterised in that the stator assembly (8) comprises a containing casing (1) according to claim 1, which is arranged with its axis (2) coinciding with the axis of the stator (9) and houses the stator (9) itself in its compartment (3) with the heads (92) of the coils (91) inserted between the protuberances (100) of the first radially inner part (10) of the casing (1).

\* \* \* \* \*